United States Patent
Miyasaka

(10) Patent No.: US 10,308,182 B2
(45) Date of Patent: Jun. 4, 2019

(54) DISPLAY DEVICE AND VEHICLE DOOR

(71) Applicant: Yazaki Corporation, Tokyo (JP)

(72) Inventor: Hideki Miyasaka, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 10 days.

(21) Appl. No.: 15/708,244

(22) Filed: Sep. 19, 2017

(65) Prior Publication Data

US 2018/0079362 A1    Mar. 22, 2018

(51) Int. Cl.
| | |
|---|---|
| G03B 21/14 | (2006.01) |
| B60R 1/00 | (2006.01) |
| B60Q 1/26 | (2006.01) |
| G03B 21/28 | (2006.01) |
| B60R 11/02 | (2006.01) |
| B60R 13/02 | (2006.01) |
| G03B 29/00 | (2006.01) |
| B60R 11/00 | (2006.01) |

(52) U.S. Cl.
CPC ............ *B60R 1/007* (2013.01); *B60Q 1/2669* (2013.01); *B60R 11/0229* (2013.01); *B60R 13/0243* (2013.01); *G03B 21/145* (2013.01); *G03B 21/147* (2013.01); *G03B 21/28* (2013.01); *G03B 29/00* (2013.01); *B60R 2011/0021* (2013.01); *B60R 2300/202* (2013.01); *B60R 2300/205* (2013.01); *B60R 2300/802* (2013.01)

(58) Field of Classification Search
CPC ...... G03B 21/14; G03B 21/147; G03B 21/28; G03B 29/00; B60Q 1/2669; B60R 1/007; B60R 11/0229; B60R 11/0243

USPC ....................................................... 353/13, 14
See application file for complete search history.

(56) References Cited

U.S. PATENT DOCUMENTS

| | | | | |
|---|---|---|---|---|
| 7,175,321 | B1* | 2/2007 | Lopez | B60Q 1/50 296/21 |
| 2008/0297726 | A1* | 12/2008 | Rodriguez, Jr. | G03B 21/14 353/13 |
| 2011/0273671 | A1* | 11/2011 | Chu | G03B 21/14 353/13 |
| 2015/0029470 | A1 | 1/2015 | Kanai et al. | |
| 2015/0168721 | A1 | 6/2015 | Yamasaki | |
| 2015/0298598 | A1* | 10/2015 | Nussli | B60Q 1/2665 345/2.2 |

(Continued)

FOREIGN PATENT DOCUMENTS

| | | |
|---|---|---|
| JP | 2008-009654 A | 1/2008 |
| JP | 2015-25872 A | 2/2015 |

(Continued)

OTHER PUBLICATIONS

Communication dated Oct. 30, 2018 by the Japanese Patent Office in counterpart application No. 2016-183598.

*Primary Examiner* — William C. Dowling
(74) *Attorney, Agent, or Firm* — Sughrue Mion, PLLC

(57) ABSTRACT

A display device and a vehicle door include a projection surface provided on a surface on a vehicle interior side of a door body provided at a vehicle, a projector configured to project an image, and a holding unit configured to hold the projector at the door body, in such a positional relationship that the image from the projector is projected on the projection surface. Thus, the display device and the vehicle door can effectively project an image appropriately on the vehicle door body.

19 Claims, 3 Drawing Sheets

(56) References Cited

U.S. PATENT DOCUMENTS

| | | | |
|---|---|---|---|
| 2016/0023665 A1* | 1/2016 | Sherony | B60W 50/12 |
| | | | 701/2 |
| 2017/0050558 A1* | 2/2017 | Salter | B60R 1/12 |
| 2017/0210282 A1* | 7/2017 | Rodriguez Barros | B60Q 1/323 |
| 2017/0237945 A1* | 8/2017 | Murar | H04N 7/183 |
| | | | 348/148 |
| 2018/0147985 A1* | 5/2018 | Brown | B60K 35/00 |

FOREIGN PATENT DOCUMENTS

| | | |
|---|---|---|
| JP | 2015-116902 A | 6/2015 |
| JP | 2015-148678 A | 8/2015 |

* cited by examiner

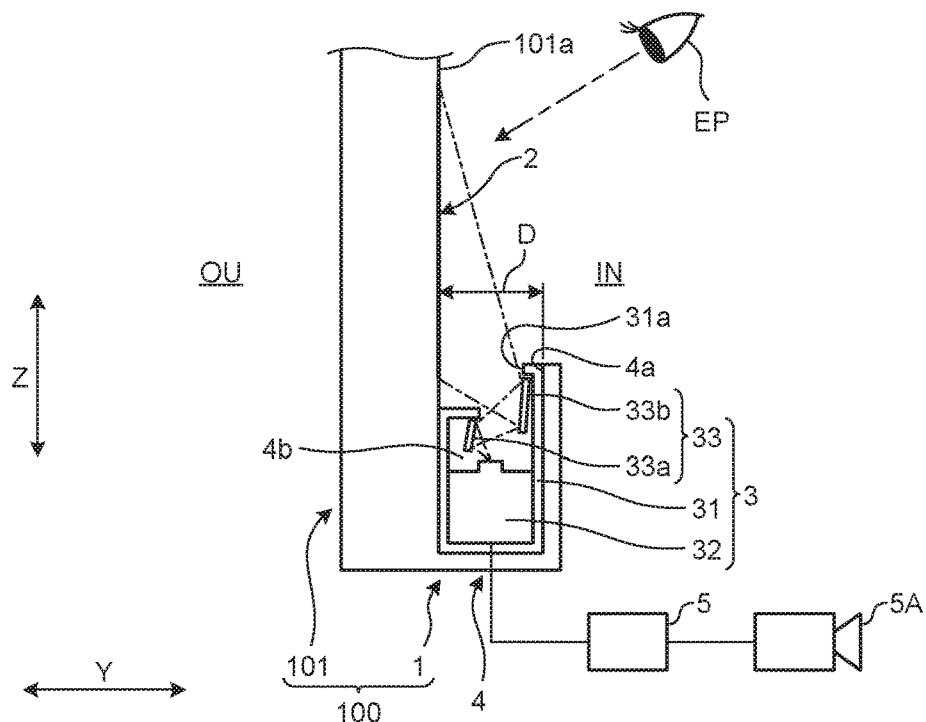
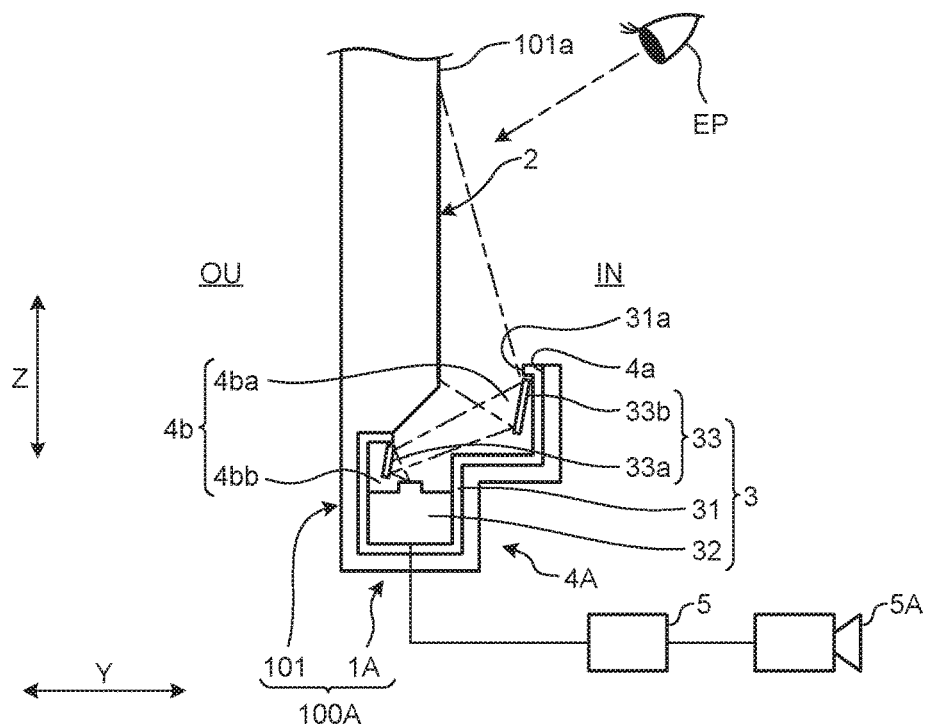

DISPLAY DEVICE AND VEHICLE DOOR

CROSS-REFERENCE TO RELATED APPLICATION(S)

The present application claims priority to and incorporates by reference the entire contents of Japanese Patent Application No. 2016-183598 filed in Japan on Sep. 21, 2016.

BACKGROUND OF THE INVENTION

1. Field of the Invention

The present invention relates to a display device and a vehicle door.

2. Description of the Related Art

As a conventional display device applied to a vehicle, for example, in Japanese Patent Application Laid-open No. 2008-9654, a vehicle display device is disclosed which captures images around a vehicle, and projects an image of a vehicle blind spot into the vehicle interior from a projector.

Incidentally, the vehicle display device described in Japanese Patent Application Laid-open No. 2008-9654, has room for further improvement, for example, in projection of an image on a vehicle door body.

SUMMARY OF THE INVENTION

The present invention has been made in view of the above circumstance, and an object of the present invention is to provide a display device and a vehicle door which appropriately project an image to a vehicle door body.

In order to achieve the above mentioned object, a display device according to one aspect of the present invention includes a projection surface provided on a surface on a vehicle interior side of a door body provided at a vehicle; a projector configured to project an image; and a holding unit configured to hold the projector at the door body, in such a positional relationship that the image from the projector is projected on the projection surface.

According to another aspect of the present invention, in the display device, it is possible to configure that the projector includes a reflection unit configured to reflect projection light representing the image to the projection surface, and the holding unit holds the projector at the door body, in such a positional relationship that at least part of the reflection unit is positioned on the vehicle interior side relative to a surface provided with the projection surface, in the door body.

According to still another aspect of the present invention, in the display device, it is possible to configure that the reflection unit includes a magnifying mirror configured to enlarge and reflect the image represented by the projection light.

According to still another aspect of the present invention, in the display device, it is possible to configure that the reflection unit includes a free curved surface mirror configured to correct distortion of the image represented by the projection light and reflect the image.

According to still another aspect of the present invention, in the display device, it is possible to configure that the reflection unit includes a first mirror and a second mirror, the first mirror reflects the projection light representing the image to the second mirror, and the second mirror reflects the projection light from the first mirror to the projection surface.

According to still another aspect of the present invention, in the display device, it is possible to configure that the projection surface is positioned vertically below an eye point previously estimated, and the holding unit holds the projector at the door body, in such a positional relationship that the projector projects the image to the projection surface from vertically below the projection surface.

In order to achieve the above mentioned object, a vehicle door according to one aspect of the present invention includes a door body provided at a vehicle; a projection surface provided on a surface on a vehicle interior side of the door body; a projector configured to project an image; and a holding unit configured to hold the projector at the door body, in such a positional relationship that the image from the projector is projected on the projection surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic cross-sectional view illustrating a schematic configuration of the display device and the vehicle door according to the first embodiment;

FIG. 3 is a schematic cross-sectional view illustrating a schematic configuration of a display device and a vehicle door according to a second embodiment.

DETAILED DESCRIPTION OF THE PREFERRED EMBODIMENTS

Hereinafter, embodiments according to the present invention will be described in detail with reference to the drawings. Note that the present invention is not limited to the embodiments. In addition, component elements in the embodiments described below include component elements readily substituted by a person skilled in the art or substantially the same component elements.

First Embodiment

Figure 1:
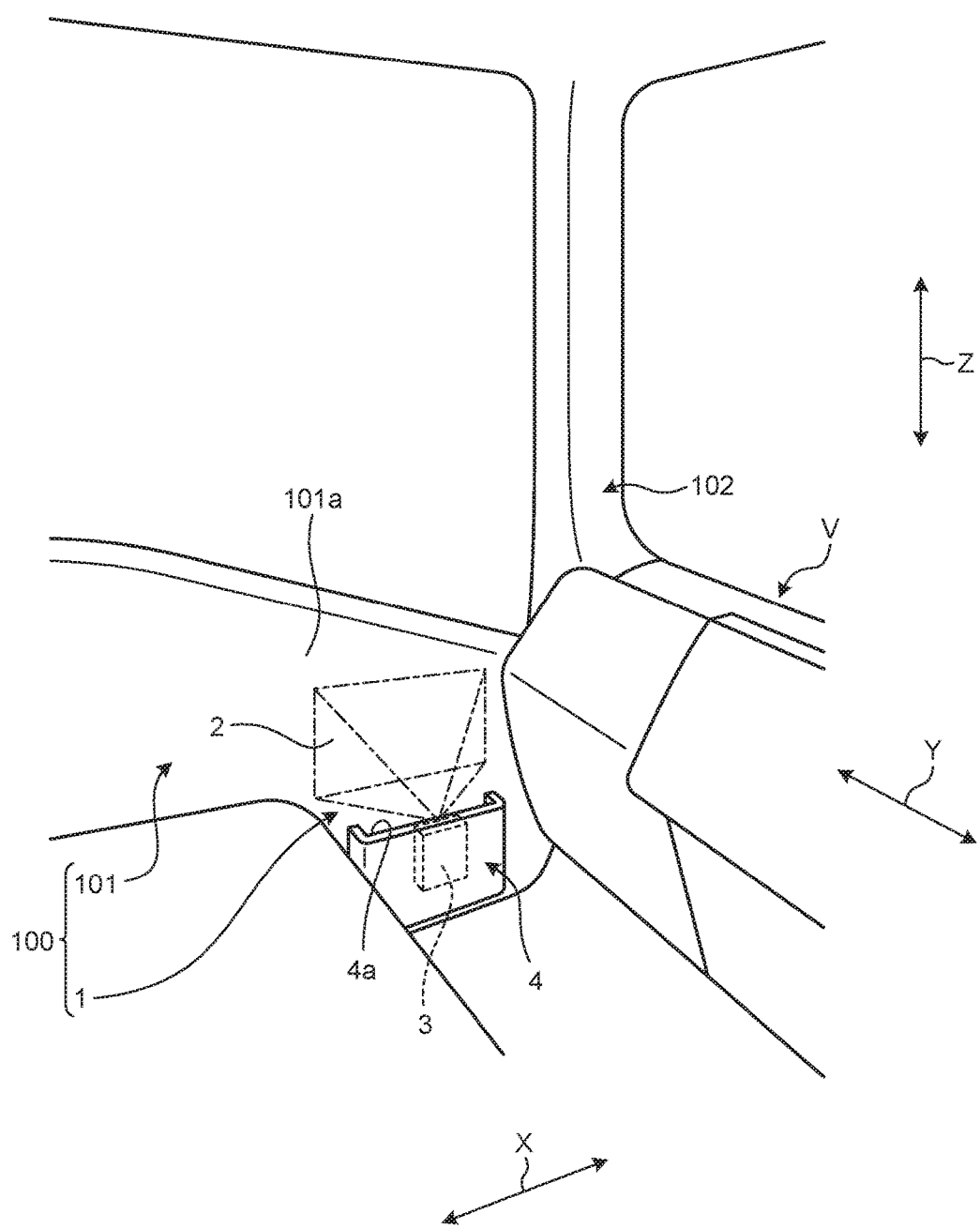
FIG. 1 is a partial schematic view illustrating a schematic configuration of a display device and a vehicle door according to a first embodiment.

A display device 1 according to the present embodiment illustrated in FIGS. 1 and 2 is applied to a vehicle door 100 of a vehicle V to displays various images. In the following description, in the vehicle V to which the display device 1 and the vehicle door 100 are applied, "vehicle longitudinal direction X" typically corresponds to a total length direction of the vehicle V, and furthermore, corresponds to a direction along a straight forward/backward direction of the vehicle V. "Vehicle width direction Y" typically corresponds to a total width direction of the vehicle V, and corresponds to a vehicle rightward/leftward direction of the vehicle V. "Vehicle height direction Z" typically corresponds to a vehicle height direction of the vehicle V. The vehicle longitudinal direction X as a first direction, vehicle width direction Y as a second direction, and vehicle height direction Z as a third direction are orthogonal to each other, and when the vehicle V is positioned on a horizontal plane, the vehicle longitudinal direction X and the vehicle width direction Y are each positioned along a horizontal direction, and the vehicle height direction Z is positioned along a vertical direction. Furthermore, in the following description, the vehicle longitudinal direction X may be referred to as "forward" for a side to which the vehicle V moves forward, and "rearward" for a side to which the vehicle V moves backward. The vehicle width direction Y may be referred to as "left side" for a left side, looking forward in the vehicle longitudinal direction X, and "right side" for a right side, looking forward in the vehicle longitudinal direction X. The vehicle height direction Z may be referred to as "upper side" for an upper side in the vertical direction, and "lower side" for a lower side in the vertical direction. Unless otherwise specified, directions used in the following description are directions represented in a state in which units are assembled to each other.

The vehicle door 100 is a door with a display device including a door body 101 openably and closably provided at the vehicle V, and the display device 1 configured to project and display various images on a projection surface 2 provided on the door body 101, achieving appropriate image projection on the door body 101. Here, the door body 101 is a partition body partitioning a space portion on a vehicle interior side IN where driver's seat or the like is provided, and a space portion on a vehicle exterior side OU, in the vehicle width direction Y. The door body 101 has a forward end in the vehicle longitudinal direction X, serving as a hinge side, and is supported to be opened and closed to a vehicle body 102 of the vehicle V, through hinge connection or the like. The door body 101 has a layer structure including, for example, an outer panel constituting an outside wall portion on the vehicle exterior side OU, an inner panel constituting an inside wall portion on the vehicle interior side IN, trim constituting an interior surface on the vehicle interior side IN, and the like. In the door body 101, a door shell is formed having a door framework of the outer panel and the inner panel, and a component mounting space is formed between the outer panel and the inner panel. The door body 101 has various internal door components, such as a wire harness for power supply or signal communication to various electronic devices mounted to the door body 101 including the display device 1, a door lock, a door glass, a glass regulating unit, which are incorporated in the component mounting space. The door body 101 has interior components, such as armrests and inner handles, mounted to the trim constituting an interior surface on the vehicle interior side IN. Hereinafter, a configuration of the display device 1 applied to the vehicle door 100 will be described in detail with reference to FIGS. 1 and 2. Note that, in FIG. 2, illustration of an internal structure of the door body 101 is omitted (similarly omitted in FIGS. 3 and 4 to be described later).

Specifically, the display device 1 includes the projection surface 2, a projector 3, a holding unit 4, and a control device 5.

The projection surface 2 is a screen provided on a projection-surface-installation surface 101a of the door body 101. The projection-surface-installation surface 101a is a surface on the vehicle interior side IN of the door body 101 provided at the vehicle V. Furthermore, the projection-surface-installation surface 101a is an innermost surface of the door body 101 on the vehicle interior side IN, and is, for example, constituted by a surface on the vehicle interior side IN of the trim. The projection surface 2 is an area of the projection-surface-installation surface 101a on which projection light representing an image is projected from the projector 3, and is set to any position. Here, the projection surface 2 is provided at a forward end in the vehicle longitudinal direction X and a lower side end in the vehicle height direction Z of the projection-surface-installation surface 101a, to have a substantially rectangular shape. Thus, the projection surface 2 according to the present embodiment is positioned vertically below an eye point EP previously estimated. Here, the eye point EP is typically assumed in advance to be positioned within a so-called eye range in the vehicle V to which the display device 1 and the vehicle door 100 are applied. Here, the eye range represents "eye range of drivers for automobiles", and corresponds to an area of drivers' viewpoints previously defined according to the vehicle. The eye range typically represents a statistical distribution of the positions of drivers' eyes in the vehicle V, and corresponds to an area having, for example, a predetermined percentage (e.g., 95%) of positions of the eyes of the drivers sitting on a driver's seat. The projection-surface-installation surface 101a including the projection surface 2 according to the present embodiment is typically constituted as a surface not transmitting light. Then, the projection surface 2 constitutes, for example, a diffusion or reflection screen, on the projection-surface-installation surface 101a. The projection surface 2 reflects projection light representing an image, input from the projector 3, to the eye point EP, so that the driver or the like can visually recognize the image represented by the projection light. For preferable specular reflection of the projection light representing an image, projected on the projection-surface-installation surface 101a, from the projector 3, for example, surface treatment such as fine processing, surface coating, a resin sheet, or the like is applied to the projection surface 2. Note that, here, the eye point EP is assumed on the basis of the driver of the vehicle V, but is not limited thereto, and may be assumed on the basis of another occupant of the vehicle V.

The projector 3 is a device for projecting an image, more specifically, a device for projecting the projection light representing an image to the projection surface 2, and displays an image represented by the projection light on the projection surface 2. The projector 3 includes a casing 31, a main body unit 32, and a reflection unit 33. Typically, the projector 3 preferably uses a so-called short focus projector to be disposed closer to the projection-surface-installation surface 101a provided with the projection surface 2 as much as possible, for achievement of close range projection to the projection surface 2. In the projector 3 according to the present embodiment, the reflection unit 33 includes an intermediate mirror 33a as a first mirror, and a final mirror 33b as a second mirror. In the projector 3, a folded projection optical system is constituted by two reflection systems of the intermediate mirror 33a and the final mirror 33b both constituting the reflection unit 33, and a lens system such as a projection lens constituting the main body unit 32, and near focus is achieved.

The casing 31 has an inside formed into a hollow box shape which has an inner space portion storing the main body unit 32 and the reflection unit 33. The casing 31 has an opening 31a formed as a light path for projection light projected on the projection surface 2. Here, the opening 31a is formed in a surface of the casing 31 positioned on the upper side in the vehicle height direction Z.

The main body unit 32 is a projector body emitting the projection light representing an image, and includes a light source such as an LED element, a display panel such as a microdisplay forming a raw image of an image to be projected, and a lens system such as a projection lens (projection lens, imaging lens). The main body unit 32 is disposed in the casing 31 to emit the projection light representing an image to the opening 31a positioned on the upper side in the vehicle height direction Z.

The reflection unit 33 constitutes a reflection system for reflecting the projection light representing an image emitted from the main body unit 32 to the projection surface 2, and here, includes the intermediate mirror 33a and the final mirror 33b as described above. The intermediate mirror 33a is an intermediate bending mirror totally reflecting the projection light representing an image, emitted from the main body unit 32, to the final mirror 33b. The final mirror 33b is a final reflective mirror totally reflecting projection light from the intermediate mirror 33a, that is, the projection light representing an image, emitted from the main body unit 32 and totally reflected from the intermediate mirror 33a, to the projection surface 2. The final mirror 33b according to the present embodiment is a magnifying mirror enlarging and reflecting an image represented by the projection light, and is also a free curved surface mirror correcting distortion of the image represented by the projection light and reflecting the image. The final mirror 33b functioning as the magnifying mirror is formed as a concave or convex mirror. The final mirror 33b functioning as the magnifying mirror enlarges and reflects an image represented by the projection light so that the image reflected by the final mirror 33b, is larger relative to the image before reflected by the final mirror 33b. Furthermore, the final mirror 33b functioning as the free curved surface mirror is formed as a mirror having a shape asymmetrical with respect to an optical axis, differently from a spherical surface or a paraboloidal surface, and is also referred to as an aspherical mirror. That is, the final mirror 33b is formed as a mirror having a concave or convex shape, and a shape asymmetrical with respect to the optical axis. The final mirror 33b functioning as the free curved surface mirror is formed in a shape according to a surface shape of the projection surface 2 or a geometrical positional relationship between the projection surface 2 and the final mirror 33b and distortion of an image represented by projection light, displayed on the projection surface 2, is optically corrected to have a desired shape, when the projection light is reflected to the projection surface 2.

The holding unit 4 holds the projector 3 at the door body 101, in such a positional relationship that an image from the projector 3 is projected on the projection surface 2. The holding unit 4 according to the present embodiment holds the projector 3 at the door body 101, in such a positional relationship that at least part of the reflection unit 33 is positioned on the vehicle interior side IN relative to the projection-surface-installation surface 101a provided with the projection surface 2, in the door body 101. Here, the holding unit 4 holds the projector 3 at the door body 101, in such a positional relationship that the whole projector 3 including the casing 31, the main body unit 32, and the reflection unit 33 is positioned on the vehicle interior side IN relative to the projection-surface-installation surface 101a. The holding unit 4 according to the present embodiment is formed at a position below the projection surface 2 in the vehicle height direction Z so as to project to the vehicle interior side IN from the trim constituting the door body 101. Here, the holding unit 4 is formed into a pocket shape having an opening 4a on the upper side in the vehicle height direction Z, and stores and holds the whole projector 3 in an inner holding space portion 4b. In the projector 3 stored and held in the holding space portion 4b of the holding unit 4, the opening 31a is exposed from the opening 4a of the holding unit 4. Furthermore, as described above, the holding unit 4 is positioned below the projection surface 2 in the vehicle height direction Z, that is, positioned vertically below the projection surface 2. Accordingly, the holding unit 4 holds the projector 3 at the door body 101, in such a positional relationship that the projector 3 projects an image to the projection surface 2 from vertically below the projection surface 2. That is, the projector 3 stored and held in the holding space portion 4b of the holding unit 4 projects the projection light representing an image to the projection surface 2 from vertically below the projection surface 2, and displays the image represented by the projection light on the projection surface 2. The holding unit 4 is formed so that an internal dimension of the holding space portion 4b along the vehicle width direction Y, in other words, a distance D between the trim along the vehicle width direction Y and an inner wall surface partitioning the holding space portion 4b is for example approximately 80 mm. The holding unit 4 may be provided at the trim constituting the door body 101, the outer panel constituting the door body 101, or the inner panel constituting the door body 101.

The control device 5 integrally controls the units of the projector 3 to control an image to be displayed by the projector 3. The control device 5 includes a known microcomputer-based electronic circuit including a CPU, a ROM, a RAM, and an interface. The control device 5 is electrically connected to the projector 3 through the interface. The control device 5 may be connected to the projector 3 through the wire harness or the like, or may be stored in the casing 31 of the projector 3 to be integrally formed with the projector 3. Furthermore, the control device 5 may be also used as an electronic control unit (ECU) or the like integrally controlling the whole vehicle V, or may be constituted separately from the ECU to send/receive information, such as a detection signal, a drive signal, or a control instruction, between them. The control device 5 executes a control program stored in the ROM, RAM, or the like to perform various processing for outputting a control signal to the projector 3, controlling the operation of the projector 3, and controlling an image to be displayed on the projection surface 2 by the projector 3. The control device 5 is, for example, electrically connected to an imaging device 5A which is configured to image an outside of the vehicle V, that is, the vehicle exterior side OU, and controls the projector 3 on the basis of an image captured by the imaging device 5A to project, to the projection surface 2, an image including blind spot information on the side of a front passenger seat which is viewed from the driver's seat of the vehicle V. Thus, in the door body 101, the control device 5 can cause the projection surface 2 to which an image including the blind spot information is projected to function as a so-called safety window or a blind-spot check window which is provided at a heavy vehicle such as a truck.

The display device 1 and the vehicle door 100 described above are configured so that an image is projected from the projector 3 held at the door body 101 by the holding unit 4, to the projection surface 2 provided on the projection-surface-installation surface 101a on the vehicle interior side IN of the door body 101. Thus, in the display device 1 and the vehicle door 100, an obstacle, such as an occupant of the vehicle V or baggage, is less likely to be interposed on the light path for projection light from the projector 3 to the projection surface 2, so that the projection light is not blocked before reaching the projection surface 2. Furthermore, in the display device 1 and the vehicle door 100, both of the projection surface 2 and the projector 3 which is configured to project an image to the projection surface 2 are provided at the door body 101, so that even when the vehicle V is vibrated, both of the projection surface 2 and the projector 3 are vibrated with the door body 101, and a relative positional relationship between the projection surface 2 and the projector 3 is difficult to be changed. Thus, the display device 1 and the vehicle door 100 can be configured so that an image projected on the projection surface 2 is less likely to be shifted. Accordingly, in the display device 1 and the vehicle door 100, an image can be projected appropriately on the door body 101 of the vehicle V.

Furthermore, in the display device 1 and the vehicle door 100 described above, since the holding unit 4 holds the projector 3 at the door body 101 so that the reflection unit 33 is partially positioned on the vehicle interior side IN relative to the projection-surface-installation surface 101a, the projection light representing an image can be projected on the projection surface 2 from the vehicle interior side IN relative to the projection surface 2 through the reflection unit 33. Accordingly, in the display device 1 and the vehicle door 100, an image can be projected appropriately on the door body 101 of the vehicle V without affecting the internal door components or the like of the door body 101.

Furthermore, in the display device 1 and the vehicle door 100 described above, the reflection unit 33 includes the final mirror 33b functioning as a magnifying mirror, and an image represented by projection light emitted from the main body unit 32 can be enlarged into a desired size to be projected on the projection surface 2, and thus, an image can be also projected appropriately on the door body 101 of the vehicle V, in this respect.

Furthermore, in the display device 1 and the vehicle door 100 described above, the reflection unit 33 includes the final mirror 33b functioning as a free curved surface mirror, and distortion of an image represented by projection light emitted from the main body unit 32 can be corrected and the image is projected on the projection surface 2, and thus, an image can be also projected appropriately on the door body 101 of the vehicle V, in this respect.

Furthermore, in the display device 1 and the vehicle door 100 described above, projection light emitted from the main body unit 32 can be reflected on the intermediate mirror 33a and the final mirror 33b to be projected on the projection surface 2. Then, the display device 1 and the vehicle door 100 can adjust the light path for projection light from the projector 3 to the projection surface 2 by combining the intermediate mirror 33a and the final mirror 33b, so that a positional relationship between an optical axis direction (emitting direction) of projection light emitted from the main body unit 32, and the projection surface 2 can be freely adjusted, and, for example, the positional relationship between the optical axis direction and the projection surface 2 can approach parallel. Thus, in the display device 1 and the vehicle door 100, for example, amounts of the projector 3 and the holding unit 4 projecting on the vehicle interior side IN from the projection-surface-installation surface 101a may be inhibited.

Furthermore, in the display device 1 and the vehicle door 100 described above, the projector 3 is disposed in such a geometrical positional relationship that an image is projected to the projection surface 2 positioned vertically below the eye point EP, from vertically below the projection surface 2. Accordingly, in the display device 1 and the vehicle door 100, for example, in comparison with projection of an image from vertically above the projection surface 2 to the projection surface 2 by the projector 3, influence of reflection of sunlight toward the eye point EP in the projection surface 2 is inhibited, and an image projected from the projector 3 and reflected on the projection surface 2 to the eye point EP looks relatively bright, and visibility of an image projected on the projection surface 2 can be improved.

Second Embodiment

A display device and a vehicle door according to a second embodiment are different from those of the first embodiment in a projector holding position. Hereinafter, component elements similar to those of the above embodiment are denoted by common reference signs, and repeated description of common configurations, functions, and effects will be omitted as much as possible (hereinafter the same shall apply).

A vehicle door 100A according to the present embodiment illustrated in FIG. 3 includes the door body 101 and a display device 1A. The display device 1A includes the projection surface 2, the projector 3, a holding unit 4A, and the control device 5. The display device 1A and the vehicle door 100A are different from the display device 1 and the vehicle door 100 described above, in that the holding unit 4A is provided instead of the holding unit 4, and have the other configurations substantially similar to those of the display device 1 and the vehicle door 100 described above, although slightly different in shape, size, and the like of the casing 31 or the like.

The holding unit 4A holds the projector 3 at the door body 101, in such a positional relationship that an image from the projector 3 is projected on the projection surface 2. The holding unit 4A according to the present embodiment holds the projector 3 at the door body 101, in such a positional relationship that the final mirror 33b of the reflection unit 33 constituting the projector 3, and part of the casing 31 configured to store the final mirror 33b are positioned on the vehicle interior side IN relative to the projection-surface-installation surface 101a, and the other portions, that is, the main body unit 32, the intermediate mirror 33a of the reflection unit 33, and the rest of the casing 31 are positioned on the vehicle exterior side OU relative to the projection-surface-installation surface 101a. The holding unit 4A is formed into a pocket shape having the opening 4a on the upper side in the vehicle height direction Z, and stores and holds the whole projector 3 in the inner holding space portion 4b. The holding space portion 4b according to the present embodiment includes a first space portion 4ba positioned on the vehicle interior side IN relative to the projection-surface-installation surface 101a to be exposed on the vehicle interior side IN, and a second space portion 4bb positioned on the vehicle exterior side OU relative to the projection-surface-installation surface 101a, here, in the door body 101. The first space portion 4ba holds and stores the final mirror 33b of the reflection unit 33 constituting the projector 3, and part of the casing 31 storing the final mirror 33b. The second space portion 4bb stores and holds the main body unit 32, the intermediate mirror 33a of the reflection unit 33, and the rest of the casing 31. The first space portion 4ba and the second space portion 4bb communicate with each other, and the opening 4a is formed on the side of the first space portion 4ba. In the projector 3 stored and held in the holding space portion 4b of the holding unit 4A, the opening 31a of the casing 31 is exposed from the opening 4a of the holding unit 4A. The holding unit 4A may be provided at the trim constituting the door body 101, the outer panel constituting the door body 101, or the inner panel constituting the door body 101.

In the display device 1A and the vehicle door 100A described above, an image is projected from the projector 3 held at the door body 101 by the holding unit 4A, to the projection surface 2 provided on a surface on the vehicle interior side IN of the door body 101, and the image can be projected appropriately on the door body 101 of the vehicle V. Furthermore, in the display device 1A and the vehicle door 100A described above, a volume of a portion of the holding unit 4A projecting on the vehicle interior side IN from the projection-surface-installation surface 101a can be relatively reduced, and comfortability on the vehicle interior side IN can be improved.

Third Embodiment

A display device and a vehicle door according to a third embodiment are different from those of the first embodiment in configuration of a projection surface, projector holding position, disposition, and the like.

Figure 4:
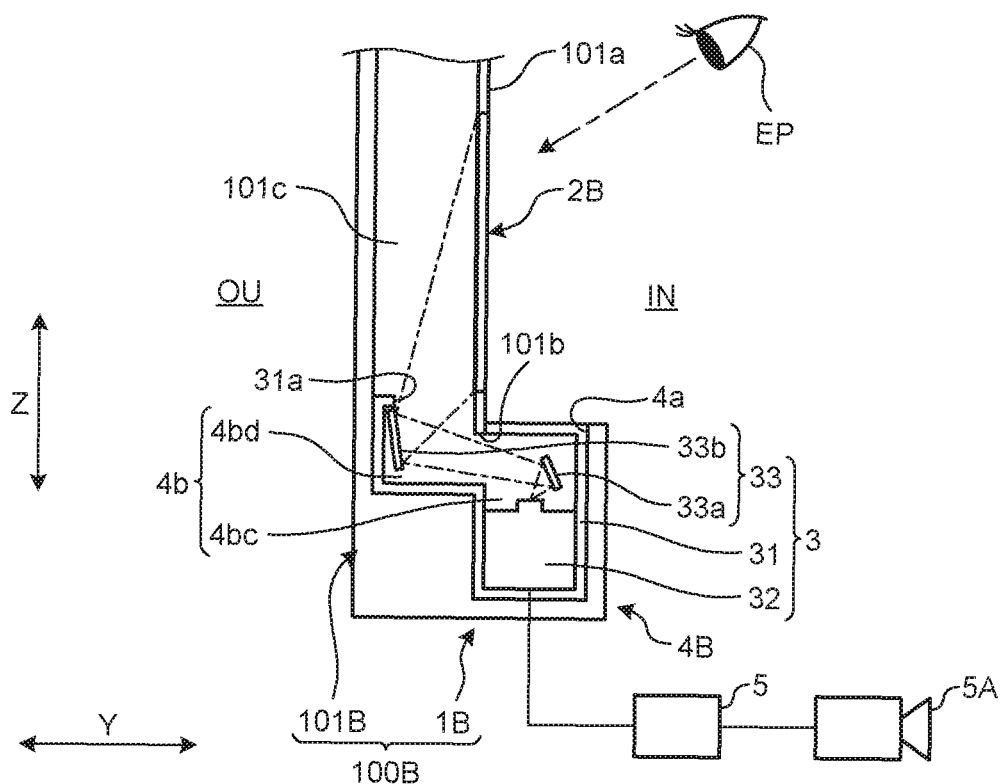
FIG. 4 is a schematic cross-sectional view illustrating a schematic configuration of a display device and a vehicle door according to a third embodiment.

A vehicle door 100B according to the present embodiment illustrated in FIG. 4 includes a door body 101B and a display device 1B. The display device 1B includes a projection surface 2B, a projector 3, a holding unit 4B, and the control device 5.

The door body 101B according to the present embodiment is different from the door body 101 described above, in that an opening 101b and an inner light path space portion 101c which serve as a light path for the projection light representing an image, projected from the projector 3 to the projection surface 2B are formed, and has the other configurations substantially similar to those of the door body 101 described above. The opening 101b is formed below the projection-surface-installation surface 101a of the door body 101B in the vehicle height direction (vertical direction) Z, that is, on a side on which the projector 3 and the holding unit 4B are formed, and communicates with a space on the vehicle interior side IN and a space in the door body 101B, across the projection-surface-installation surface 101a. The inner light path space portion 101c is formed in the door body 101B, for example, between the outer panel and the inner panel or between the inner panel and the trim. The opening 101b and the inner light path space portion 101c communicates with the opening 4a and the holding space portion 4b of the holding unit 4B.

The display device 1B is different from the display device 1 described above, in that the projection surface 2B is provided instead of the projection surface 2, and the holding unit 4B is provided instead of the holding unit 4, and has the other configurations substantially similar to those of the display device 1 described above, although slightly different in shape, size, and the like of the casing 31 or the like.

The projection surface 2B is formed at a position similar to that of the projection surface 2 described above, on the projection-surface-installation surface 101a. The projection surface 2B according to the present embodiment constitutes a transmissive screen transmitting light and scattering the transmitted light in the projection-surface-installation surface 101a. The projection surface 2B is sometimes referred to as a rear-projection screen. That is, the projection surface 2B transmits and scatters the projection light representing an image input from the projector 3, and the driver or the like can visually recognize the image represented by projection light. For preferable transmission and scattering of the projection light representing an image, projected on the projection-surface-installation surface 101a from the projector 3, for example, the projection surface 2B is constituted by a translucent member having optical transparency, such as vinyl resin, acrylic resin, or glass. In the door body 101B, the inner light path space portion 101c described above is formed to extend upward from the position of an upper side end of the projection surface 2B in the vehicle height direction Z, and is provided to make contact with the whole projection surface 2B.

The holding unit 4B holds the projector 3 at the door body 101B, in such a positional relationship that an image from the projector 3 is projected on the projection surface 2B. The holding unit 4B according to the present embodiment holds the projector 3 at the door body 101B, in such a positional relationship that the main body unit 32 constituting the projector 3, the intermediate mirror 33a of the reflection unit 33, and part of the casing 31 storing the intermediate mirror 33a are positioned on the vehicle interior side IN relative to the projection-surface-installation surface 101a, and the other portions, that is, the final mirror 33b of the reflection unit 33, and the rest of the casing 31 are positioned on the vehicle exterior side OU, here, in the door body 101B, relative to the projection-surface-installation surface 101a. The holding unit 4B is formed into a pocket shape having the opening 4a on the upper side in the vehicle height direction Z, and stores and holds the whole projector 3 in the inner holding space portion 4b. The holding space portion 4b according to the present embodiment includes a first space portion 4bc positioned on the vehicle interior side IN relative to the projection-surface-installation surface 101a to be exposed on the vehicle interior side IN, and a second space portion 4bd positioned on the vehicle exterior side OU relative to the projection-surface-installation surface 101a, here, in the door body 101B. The first space portion 4bc holds and stores the main body unit 32 constituting the projector 3, the intermediate mirror 33a of the reflection unit 33, and part of the casing 31 storing the intermediate mirror 33a. The second space portion 4bd stores and holds the final mirror 33b of the reflection unit 33, and the rest of the casing 31. The first space portion 4bc and the second space portion 4bd communicates with each other through the opening 101b formed in the door body 101B, and between the first space portion 4bc and the second space portion 4bd, the opening 4a is formed. In the projector 3 stored and held in the holding space portion 4b of the holding unit 4B, the opening 31a of the casing 31 is positioned in the door body 101B, and opens toward the inner light path space portion 101c. The holding unit 4B may be provided at the trim constituting the door body 101B, the outer panel constituting the door body 101B, or the inner panel constituting the door body 101B.

In the display device 1B and the vehicle door 100B described above, an image is projected from the projector 3 held at the door body 101B by the holding unit 4B, to the projection surface 2B provided on a surface on the vehicle interior side IN of the door body 101B, and the image can be appropriately projected on the door body 101B of the vehicle V. Furthermore, in the display device 1B and the vehicle door 100B according to the present embodiment, when projection light output from the main body unit 32 is reflected on the intermediate mirror 33a and the final mirror 33b and projected on the projection surface 2B, the openings 101b, 31a, and 4a, the inner light path space portion 101c, and the like in the door body 101B serve as the light path for projection light, and the projection light representing an image can be projected from the inside of the door body 101B to the projection surface 2B. Accordingly, the display device 1B and the vehicle door 100B can reliably have a configuration in which an obstacle is less likely to be interposed on the light path for projection light extending from the projector 3 to the projection surface 2B.

Note that the display device and the vehicle door according to an embodiment of the present invention are not limited to the above embodiments, and various changes and modifications may be made within the scope of claims. The display device and the vehicle door according to the present embodiment may be configured by appropriately combining the above described component elements according to the embodiments and modifications.

The projector 3 described above may not include the casing 31, and, for example, the main body unit 32, the reflection unit 33, and the like may be directly held by the holding unit 4, 4A, or 4B, in other words, the casing 31 and the holding unit 4, 4A, or 4B may be shared partially.

It has been described that the above projector 3 includes the reflection unit 33, but the present invention is not limited thereto, and may not include the reflection unit 33 and directly project an image on the projection surface 2 or 2B from the main body unit 32 without passing a reflection unit member.

It has been described that the above reflection unit 33 includes the intermediate mirror 33a as the first mirror, and the final mirror 33b as the second mirror, but the present invention is not limited thereto, and, for example, may not include the intermediate mirror 33a, or may include two or more intermediate mirrors 33a interposed. Furthermore, it has been described that the final mirror 33b is the magnifying mirror and the free curved surface mirror, but the present invention is not limited thereto. For example, in the projector 3 may have a configuration in which an image represented by projection light output from the main body unit 32 is subjected to image processing for distortion and the image displayed on the projection surface 2 or 2B has a desired shape.

It has been described that the control device 5 projects, for example, an image including blind spot information on the projection surface 2 or 2B, but the present invention is not limited thereto, and may project an image including other information on the projection surface 2 or 2B.

It has been described that the projection surface 2 or 2B is positioned vertically below the eye point EP, and the holding unit 4, 4A, or 4B holds the projector 3 at the door body 101 or 101B, in such a positional relationship that the projector 3 projects an image to the projection surface 2 or 2B from vertically below the projection surface 2 or 2B, but the present invention is not limited thereto. The holding unit 4B described above may hold the whole projector 3 in the door body 101B.

It has been described that the holding unit 4, 4A, or 4B is formed into a pocket shape to store and hold the whole projector 3 in the inner holding space portion 4b, but the present invention is not limited thereto. For example, the holding unit may be configured to include a holding latch unit formed at one of the door body 101 or 101B and the projector 3, and a holding recess portion formed at the other of the door body 101 or 101B and the projector 3 to be engaged with the holding latch unit, and hold the projector 3 at the door body 101 or 101B through the holding latch unit and the holding recess portion.

A display device and a vehicle door according to the present embodiments are configured so that an image is projected from a projector held in a door body by a holding unit to a projection surface provided on a surface on a vehicle interior side of the door body, and the image can be effectively projected on the vehicle door body appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A display device comprising:
   a projection surface provided on a surface on a vehicle interior side of a door body provided at a vehicle;
   a projector configured to project an image; and
   a holding unit configured to hold the projector at the door body, in such a positional relationship that the image from the projector is projected on the projection surface, wherein
   the projected image can be recognized by a driver of the vehicle or another occupant of the vehicle,
   the projector includes a reflection unit configured to reflect projection light representing the image to the projection surface, and
   the holding unit holds the projector at the door body, in such a positional relationship that at least part of the reflection unit is positioned on the vehicle interior side relative to a surface provided with the projection surface, in the door body.
2. The display device according to claim 1, wherein the reflection unit includes a magnifying mirror configured to enlarge and reflect the image represented by the projection light.
3. The display device according to claim 1, wherein the reflection unit includes a free curved surface mirror configured to correct distortion of the image represented by the projection light and reflect the image.
4. The display device according to claim 2, wherein the reflection unit includes a free curved surface mirror configured to correct distortion of the image represented by the projection light and reflect the image.
5. The display device according to claim 1, wherein the reflection unit includes a first mirror and a second mirror,
   the first mirror reflects the projection light representing the image to the second mirror, and
   the second mirror reflects the projection light from the first mirror to the projection surface.
6. The display device according to claim 2, wherein the reflection unit includes a first mirror and a second mirror,
   the first mirror reflects the projection light representing the image to the second mirror, and
   the second mirror reflects the projection light from the first mirror to the projection surface.
7. The display device according to claim 3, wherein the reflection unit includes a first mirror and a second mirror,
   the first mirror reflects the projection light representing the image to the second mirror, and
   the second mirror reflects the projection light from the first mirror to the projection surface.
8. The display device according to claim 4, wherein the reflection unit includes a first mirror and a second mirror,
   the first mirror reflects the projection light representing the image to the second mirror, and
   the second mirror reflects the projection light from the first mirror to the projection surface.

9. The display device according to claim 1, wherein
the projection surface is positioned vertically below an eye point previously estimated, and
the holding unit holds the projector at the door body, in such a positional relationship that the projector projects the image to the projection surface from vertically below the projection surface.

10. The display device according to claim 1, wherein
the projection surface is positioned vertically below an eye point previously estimated, and
the holding unit holds the projector at the door body, in such a positional relationship that the projector projects the image to the projection surface from vertically below the projection surface.

11. The display device according to claim 2, wherein
the projection surface is positioned vertically below an eye point previously estimated, and
the holding unit holds the projector at the door body, in such a positional relationship that the projector projects the image to the projection surface from vertically below the projection surface.

12. The display device according to claim 3, wherein
the projection surface is positioned vertically below an eye point previously estimated, and
the holding unit holds the projector at the door body, in such a positional relationship that the projector projects the image to the projection surface from vertically below the projection surface.

13. The display device according to claim 4, wherein
the projection surface is positioned vertically below an eye point previously estimated, and
the holding unit holds the projector at the door body, in such a positional relationship that the projector projects the image to the projection surface from vertically below the projection surface.

14. The display device according to claim 5, wherein
the projection surface is positioned vertically below an eye point previously estimated, and
the holding unit holds the projector at the door body, in such a positional relationship that the projector projects the image to the projection surface from vertically below the projection surface.

15. The display device according to claim 6, wherein
the projection surface is positioned vertically below an eye point previously estimated, and
the holding unit holds the projector at the door body, in such a positional relationship that the projector projects the image to the projection surface from vertically below the projection surface.

16. The display device according to claim 7, wherein
the projection surface is positioned vertically below an eye point previously estimated, and
the holding unit holds the projector at the door body, in such a positional relationship that the projector projects the image to the projection surface from vertically below the projection surface.

17. The display device according to claim 8, wherein
the projection surface is positioned vertically below an eye point previously estimated, and
the holding unit holds the projector at the door body, in such a positional relationship that the projector projects the image to the projection surface from vertically below the projection surface.

18. A vehicle door comprising:
a door body provided at a vehicle;
a projection surface provided on a surface on a vehicle interior side of the door body;
a projector configured to project an image; and
a holding unit configured to hold the projector at the door body, in such a positional relationship that the image from the projector is projected on the projection surface, wherein
the projected image can be recognized by a driver of the vehicle or another occupant of the vehicle,
the projection surface is positioned vertically below an eye point previously estimated, and
the holding unit holds the projector at the door body, in such a positional relationship that the projector projects the image to the projection surface from vertically below the projection surface.

19. A display device comprising:
a projection surface provided on a surface on a vehicle interior side of a door body provided at a vehicle;
a projector configured to project an image; and
a holding unit configured to hold the projector at the door body, in such a positional relationship that the image from the projector is projected on the projection surface, wherein
the projected image can be recognized by a driver of the vehicle or another occupant of the vehicle,
the projection surface is positioned vertically below an eye point previously estimated, and
the holding unit holds the projector at the door body, in such a positional relationship that the projector projects the image to the projection surface from vertically below the projection surface.

* * * * *